United States Patent
Hagan et al.

(10) Patent No.: US 9,742,772 B1
(45) Date of Patent: *Aug. 22, 2017

(54) ACCESS SYSTEM

(71) Applicant: Actioneer, Inc., Charlestown, MA (US)

(72) Inventors: Thomas Hagan, Boothbay, ME (US);
Bruce Tribbensee, Missoula, MT (US);
Henry D. Kerr, Marietta, GA (US)

(73) Assignee: Actioneer, Inc., Charlestown, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/095,437

(22) Filed: Apr. 11, 2016

Related U.S. Application Data

(63) Continuation of application No. 13/868,102, filed on Apr. 23, 2013, now Pat. No. 9,311,254, which is a continuation of application No. 11/695,019, filed on Mar. 31, 2007, now Pat. No. 8,429,422.

(51) Int. Cl.
*H04L 29/00* (2006.01)
*H04L 29/06* (2006.01)

(52) U.S. Cl.
CPC ................... *H04L 63/10* (2013.01)

(58) Field of Classification Search
CPC .................. G06F 17/30; H04L 9/32
USPC ....................... 713/190; 726/7, 15
See application file for complete search history.

(56) References Cited

U.S. PATENT DOCUMENTS

| | | | |
|---|---|---|---|
| 5,115,504 A | 5/1992 | Belove et al. | |
| 5,339,432 A | 8/1994 | Crick | |
| 5,371,807 A | 12/1994 | Register et al. | |
| 5,390,281 A | 2/1995 | Luciw et al. | |

(Continued)

FOREIGN PATENT DOCUMENTS

| | | |
|---|---|---|
| EP | 0615201 A2 | 9/1994 |
| EP | 0697671 A | 2/1996 |

(Continued)

OTHER PUBLICATIONS

"AI RoboForm," Siber Systems, <http://web.archive.org/web/20000302052206/http://www.roboform.com>- ;-, Updated Feb. 5, 2000, 1 page.

(Continued)

*Primary Examiner* — Brandon Hoffman
*Assistant Examiner* — Michael D Anderson
(74) *Attorney, Agent, or Firm* — HIPLegal LLP; Judith Szepesi

(57) ABSTRACT

A method and apparatus to enable a user to send an action message including secure credential is described. The system comprises a receiving logic to receive the action message from a user, a repository including encrypted user-specific data, and an agent to access a resource through a network, the agent directed as specified by a connector object invoked by the action message. The agent further comprises logic to utilize the encrypted user-specific data from the repository to log into the resource through the network, and in one embodiment, action logic to perform one or more actions as instructed by the connector invoked by the action message. The agent further comprises, in one embodiment, extraction logic for extracting information resulting from of the agent's access to the data resource specified by the connector, and communication logic to communicate a result to the user or to another agent for further use.

20 Claims, 10 Drawing Sheets

(56) References Cited

U.S. PATENT DOCUMENTS

| | | |
|---|---|---|
| 5,404,488 A | 4/1995 | Kerrigan et al. |
| 5,414,841 A | 5/1995 | Bingham et al. |
| 5,418,948 A | 5/1995 | Turtle |
| 5,454,106 A | 9/1995 | Burns et al. |
| 5,477,447 A | 12/1995 | Luciw et al. |
| 5,530,852 A | 6/1996 | Meske et al. |
| 5,544,305 A | 8/1996 | Ohmaye et al. |
| 5,621,903 A | 4/1997 | Luciw et al. |
| 5,634,121 A | 5/1997 | Tracz et al. |
| 5,644,735 A | 7/1997 | Luciw et al. |
| 5,659,794 A | 8/1997 | Caldarale et al. |
| 5,732,274 A | 3/1998 | O'Neill |
| 5,749,079 A | 5/1998 | Yong et al. |
| 5,765,028 A | 6/1998 | Gladden |
| 5,778,355 A | 7/1998 | Boyer et al. |
| 5,778,362 A | 7/1998 | Deerwester |
| 5,805,152 A | 9/1998 | Furusawa |
| 5,805,775 A | 9/1998 | Eberman et al. |
| 5,813,014 A | 9/1998 | Gustman |
| 5,819,282 A | 10/1998 | Hooper et al. |
| 5,864,848 A | 1/1999 | Horvitz et al. |
| 5,864,865 A | 1/1999 | Lakis |
| 5,893,092 A | 4/1999 | Driscoll |
| 5,963,940 A | 10/1999 | Liddy et al. |
| 5,966,652 A | 10/1999 | Coad et al. |
| 5,974,448 A | 10/1999 | Yamauchi et al. |
| 5,996,010 A | 11/1999 | Leong et al. |
| 6,026,388 A | 2/2000 | Liddy et al. |
| 6,026,410 A | 2/2000 | Allen et al. |
| 6,052,121 A | 4/2000 | Webster et al. |
| 6,085,201 A | 7/2000 | Tso |
| 6,360,280 B1 | 3/2002 | Jones |
| 6,622,147 B1 | 9/2003 | Smiga et al. |
| 7,017,188 B1 | 3/2006 | Schmeidler et al. |
| 7,254,606 B2 | 8/2007 | Hamada |
| 7,430,758 B2 | 9/2008 | Toutonghi |
| 7,624,437 B1 | 11/2009 | Fagundo et al. |
| 2002/0188565 A1 | 12/2002 | Nakamura et al. |
| 2003/0140097 A1 | 7/2003 | Schloer |
| 2004/0139328 A1 | 7/2004 | Grinberg et al. |
| 2004/0261025 A1 | 12/2004 | Rizk et al. |
| 2005/0177867 A1 | 8/2005 | Toutonghi |
| 2007/0261116 A1 | 11/2007 | Prafullchandra et al. |
| 2008/0098237 A1* | 4/2008 | Dung ............... H04L 12/58 713/189 |
| 2012/0109818 A1 | 5/2012 | Carlson et al. |
| 2014/0324692 A1 | 10/2014 | Yarbrough et al. |

FOREIGN PATENT DOCUMENTS

| | | |
|---|---|---|
| EP | 0697671 A2 | 2/1996 |
| WO | 9641288 A | 12/1996 |
| WO | 9641288 A1 | 12/1996 |

OTHER PUBLICATIONS

"Features: Fill in Forms, Fill Out Forms, Automatic Forms Completion, Auto Fill Forms, Save Forms," Siber Systems, (http://web.archive.org/web/20040615205143/http://www.roboform.com/ai.--html>, Updated Feb. 5, 2000, 3 pages.

AgileBits, <https://agilebits.com/products/onepassword/versions>, Released on May 19, 2006-Apr. 18, 2007, 28 pages.

Agosti, M., et al., "Design and Implementation of a Tool for the Automatic Construction of Hypertexts for Information Retrieval," Information Processing & Management, Jul. 1996, vol. 32, No. 4, Elsevier Science Ltd., Great Britain, pp. 459-476.

Arunachalam, Karthikeyan, "Automate User Actions in a Web Page—Microsoft Windows Workflow Foundation," <http://www.codeproject.com/KB/dotnet/WWF.aspx>, Jan. 6, 2006, 3 pages.

CodeGuru Forums, "WinInet API: Login Into a Website and Submit Info," <http://www.codeguru.com/forum/showthread.php?t=209251>, Sep. 11, 2002, 2 pages.

Croft et al "A Loosely-Coupled Integration of a Text Retrieval System and an Object-Oriented Database System," ACM 1992, pp. 223-232.

Jacobs et al "Natural Language Techniques for Intelligent Information Retrieval," ACM 1988, pp. 85-99.

\* cited by examiner

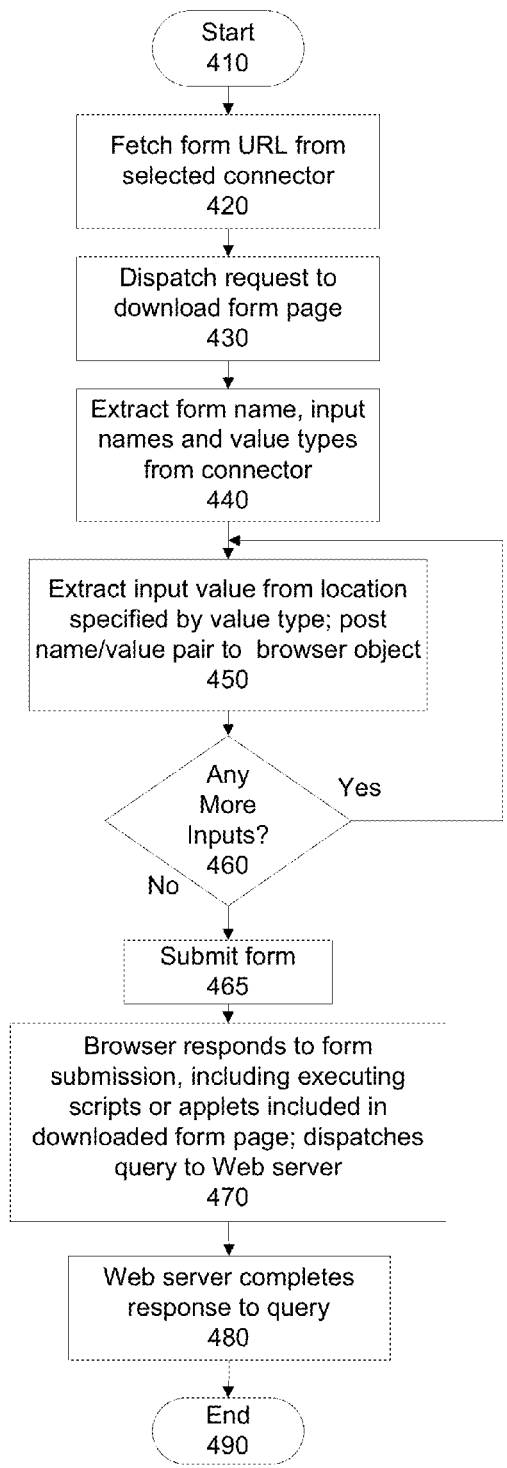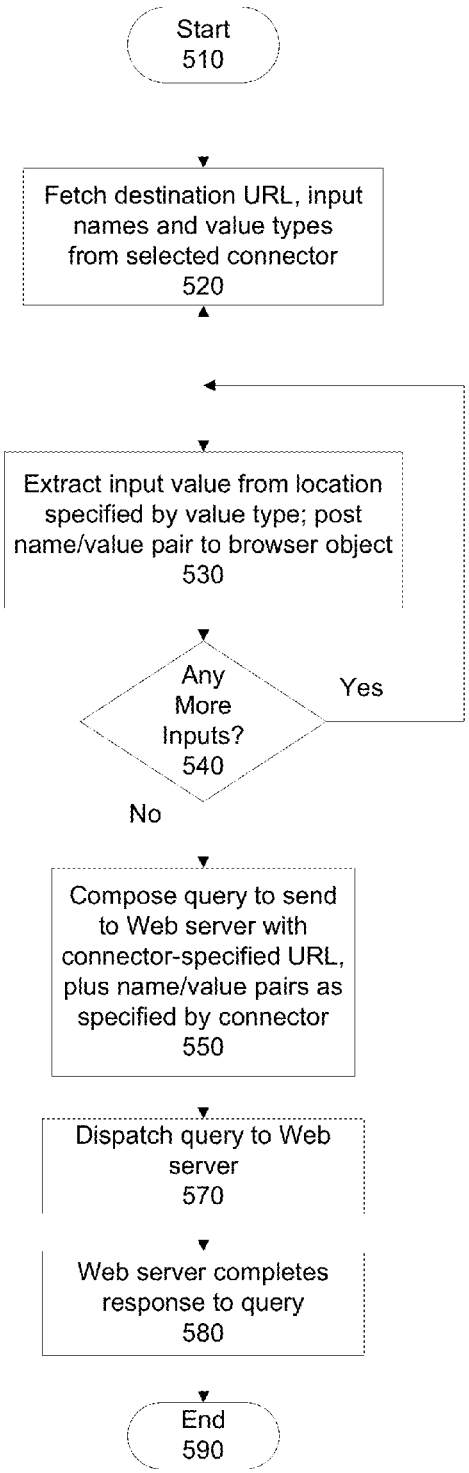
Fig. 4
Fig. 5

```
<Connector CLASS="Web" ID="84" NAME="Encyclopedia Britannica-PW" VERSION="4.0">
    <Description>
        <ufName>Encyclopedia Britannica</ufName>
        <providerName>Britannica.com</providerName>
        <connectorDesc>Login and search Encyclopedia Britannica </connectorDesc>
        <providerDesc>Encyclopedia Britannica</providerDesc>
        <serviceCategory>Encyclopedia+Reference</serviceCategory>
        <icon>britannica.ico</icon>
        <prompt>%s [topic]</prompt>
    </Description>
    <Keywords TKTYPE="tkConnKW">
        <kw>ency</kw>
        <kw>britannica</kw>
    </Keywords>
    <Actions>

<ACM ACTION="Login" AGENT="SimpleWebAgent">
        <dataList>
            <automation>True</automation>
            <command>Login</command>
        </dataList>
        <Form Action="https://secure.britannica.com/login" NAME="#0" SUBMIT="True">
            <INPUT type="hidden" name="loginRedirect" value="" />
            <INPUT type="hidden" name="failRedirect" value="/failedlogin" />
            <INPUT TKTYPE="tkUserName" NAME="username" size="14" />
            <INPUT TKTYPE="tkPassword" NAME="password" size="10" />
        </Form>
            <homeURL>http://www.britannica.com/</homeURL>
        </ACM>

<ACM ACTION="Save" AGENT="SimpleWebAgent">
        <dataList>
            <automation>True</automation>
        </dataList>
        <Form Action="http://www.britannica.com/search" Method="GET">
            <INPUT NAME="query" TKTYPE="tkQueryString" TYPE="hidden" />
        </Form>
            <homeURL>http://www.britannica.com/</homeURL>
        </ACM>
    </Actions>
</Connector>
```

Figure 8

```
<Connector CLASS="Web" ID="569" NAME="MapQuest Maps" VERSION="4.0">
    <Description>
        <ufName>MapQuest Maps</ufName>
        <providerName>MapQuest</providerName>
        <connectorDesc>Get map on MapQuest.com</connectorDesc>
        <providerDesc>MapQuest.com's site enables users to simply type in an origin and destination, or even just a city and state, to get driving directions, create customized maps, view nearby businesses and points of interest.</providerDesc>
        <serviceType>Reference</serviceType>
        <serviceCategory>Maps</serviceCategory>
        <icon>default.ico</icon>
        <prompt>%s [address, city, state] or [ ,city,state]</prompt>
    </Description>
    <Keywords TKTYPE="tkConnKW">
        <kw>mq</kw>
        <kw>map</kw>
    </Keywords>
    <Actions>
        <ACM ACTION="Save" AGENT="SimpleWebAgent">
        <dataList>
            <body/>
        </dataList>
        <Form Action="http://www.mapquest.com/maps/map.adp" Method="GET">
            <INPUT NAME="country" TYPE="hidden" VALUE="US"/>
            <INPUT NAME="address" TKTYPE="tkCommaWord1" TYPE="hidden"/>
            <INPUT NAME="city" TKTYPE="tkCommaWord2" TYPE="hidden"/>
            <INPUT NAME="state" TKTYPE="tkCommaWord3" TYPE="hidden"/>
        </Form>
            <homeURL>http://www.mapquest.com</homeURL>
        </ACM>
    </Actions>
</Connector>
```

Figure 9

ACCESS SYSTEM

RELATED APPLICATIONS

The present application claims priority to U.S. patent application Ser. No. 13/868,102, filed on Apr. 23, 2013, issuing as U.S. Pat. No. 9,311,254, with an issue date of Apr. 12, 2016, which is a continuation of U.S. patent application Ser. No. 11/695,019, filed on Mar. 31, 2007, now U.S. Pat. No. 8,429,422, with an issue date of Apr. 23, 2013. Both applications are incorporated by reference in their entirety.

FIELD OF THE INVENTION

The present invention relates to a system for providing improved access to information resources.

BACKGROUND

As the World Wide Web has more and more content available, users often utilize multiple search tools, purchasing tools, and other tools that enable them to take better advantage of the various resources available on the Web. However, the users are generally still required to perform a multi-step operation to access such data. For example, to view the local weather, the user must first enter the URL (universal resource locator) of the web page that makes weather data available, and then enter their zip code or other address indication. For sites protected by passwords, ease of access is further impaired by requiring the step of logging into the site in order to access the data.

One current solution for the requirement to enter such password data is "password saving" locally as cookies encrypted and saved by a browser. However, as has been recently found, utilizing password saving means there is a risk of spoofing, such that the password is inserted into a false web page. Also, when the computer remembers the user names and passwords, those important pieces of information tend to be forgotten by the user, who is then at a loss when the computer becomes unavailable for any reason.

Systems of this type do increase security over manual entry of user names and passwords, by blocking surreptitious keyboard loggers or visual snoopers from acquiring that confidential data, and they are faster than manual entry. But they are still entail more user actions than accessing an unprotected site by conventional browsing, even when a 'bookmark' or 'favorite' is employed to speed the process. As is generally true, increased security, here provided by requiring password entry, decreases ease of access.

SUMMARY

A system to enable a user to send an action message, the system comprising a receiving logic to receive the action message from a user, a repository including encrypted user-specific data, and an agent to access a resource through a network, the agent directed as specified by a connector object invoked by the action message. The agent further comprises logic to utilize the encrypted user-specific data from the repository to log into the resource through the network, and in one embodiment, action logic to perform one or more actions as instructed by the connector invoked by the action message. The agent further comprises, in one embodiment, extraction logic for extracting information resulting from of the agent's access to the data resource specified by the connector, and communication logic to communicate a result to the user or to another agent for further use.

BRIEF DESCRIPTION OF THE DRAWINGS

The present invention is illustrated by way of example, and not by way of limitation, in the figures of the accompanying drawings and in which like reference numerals refer to similar elements and in which:

FIG. 4 is a flowchart of one embodiment of execution of an automation action.

FIG. 5 is a flowchart illustrating one embodiment of execution of a direct action.

FIG. 8 is a script illustrating one embodiment of the contents of a connector containing two automation actions, the first for logging in to a site, and the second for triggering a search at that site.

FIG. 9 is a script illustrating one embodiment of the contents of a connector containing a direct action.

DETAILED DESCRIPTION

Figure 1:
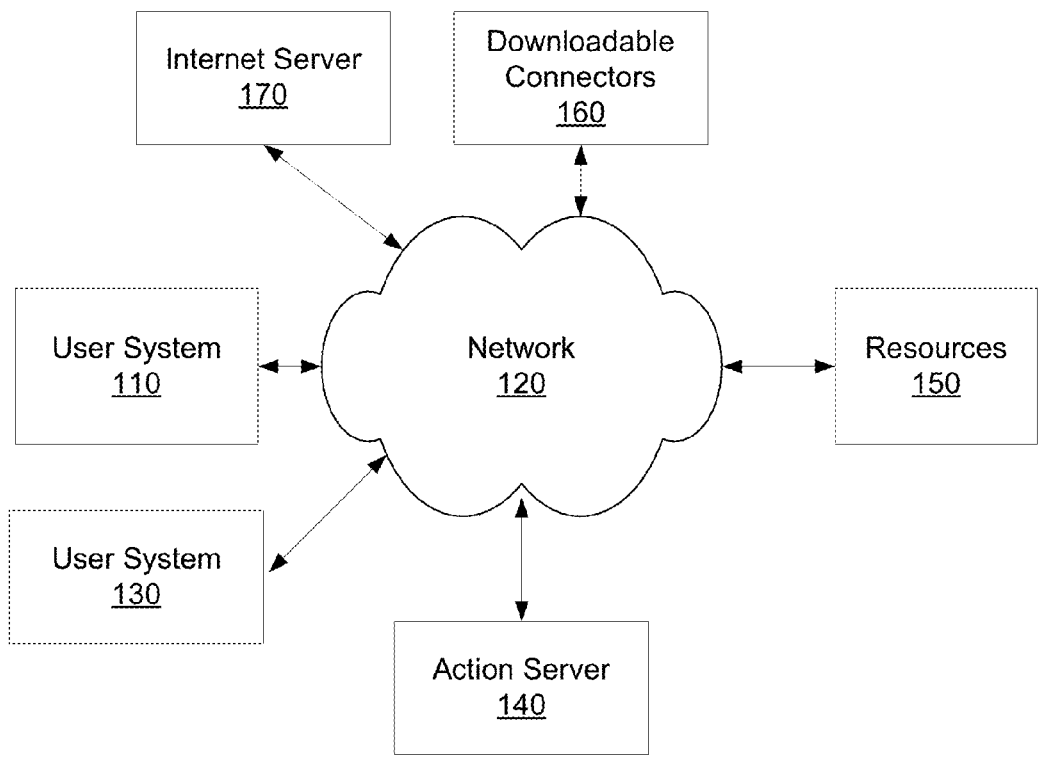
FIG. 1 is a network diagram illustrating one exemplary network on which the present invention may be implemented.

The method and apparatus described is for an improved system for interacting with data resources. The invention enhances access to password-protected data assets, making them more accessible to a user than an unprotected site reached by conventional browsing, even with a bookmark. Thus, it reverses the general rule that increased security must be at the expense of decreased ease of access.

A user enters an action message to dispatch one or more user agents, each to perform one or more actions, either within the user's local system, or on a remote site. In one embodiment, these actions can include actions that require logging into a site, or other similar security measures. The actions may also involve multiple sequential steps. For example, the actions may include: visiting a first web site, logging in using the user's credentials, obtaining some data, visiting a second web site, and utilizing the data obtained at the first site to obtain data from the second site. In one embodiment, the user's credential data—which may include username, password, credit card numbers, etc.—may be stored in a secured repository. Note that there are three terms being used here. A connector is an information object containing information used by agents in executing actions. In one embodiment, a connector has a name, a description, one or more keywords that invoke one or more actions executed by one or more agents, and specification for the one or more actions, which may be executed by one or more agents. Each agent executes actions of one or more types.

In one embodiment, agents may include web agents, which act on a web page. Web agents, in one embodiment, execute actions that may include logging in to a web site, posting information to a website, and extracting data from the web site. In one embodiment, agents may also include personal information management (PIM) agents, which act on the user's calendar, to-do list, contact list, and other organizing tools. In one embodiment, agents may post to or extract data from SQL or other database management systems.

In executing each action called for in the connector, the agent uses information provided by the connector, and may also use information included in the user's action message and information extracted from a secured repository or other data source. A connector can also contain data to inform the user that the connector is selected, information about the action(s) that will be taken in response to the user's action message, and prompting to indicate the correct formatting of text in the action message. A connector can also contain information used for display in a catalog of available connectors and category tags used in searching for connectors in desired categories.

In one embodiment, only authorized connectors invoked by the user can access the data in a secured repository. Thus, it is ensured that the credential data is only inserted at the proper destination, since the connector defines the address at which the data is inserted. So long as the actions invoked by the connectors are properly defined, this method is secure against inadvertent entry of user credential data into a destination "phishing" site falsely imitating the correct site. Furthermore, since user credentials need not be entered by keyboard, the system also guards against surreptitious keyboard loggers or visual snoopers.

FIG. 1 is a network diagram illustrating one exemplary network on which the present invention may be implemented. The user systems 110, 130 are connected to a network 120, in one embodiment. User's can define their own connectors, or may download connectors from one or more locations, such as downloadable connectors 160, or action server 140. Each connector may specify one or more actions for execution by one or more agents.

When the user invokes a connector, the agent delivers one or more queries to one or more target systems specified by the connector, which may be the user's own system, an internet server 170, an action server 140, a resource server 150, or another target. There, the target system performs one or more actions in response to the query specified by the connector. The agent may extract data from the target system to return to the user. However, that is not required. For example, the agent may simply enter data into a form sent to a remote server, and not return any data to the user other than that normally provided by the server in response to such data entry. In another embodiment, the agent reports success or failure of the attempt to complete the action. In another embodiment, the agent may extract data from a target system for display to the user or for storage in a location specified by the connector or for inclusion in a subsequent action.

In one embodiment, communication between the system and the user is via action messages entered as typed input text by the user and system output is presented as visual displays. The visual displays may be presented by the connector system via a pop-up or other display, by a browser window opened by the action, or through another interface.

In another embodiment, user input is by speech, with speech to text software converting speech messages to text messages, and system output to the user is presented as audible sounds via loudspeaker or earphone. Any combination of input and output mechanisms may be used. In one embodiment, the user may set his or her preferences as to input and output formats. In one embodiment, specific connectors may define the available input and output formats for that connector. In one embodiment, there may be different connectors for each input/output mechanism.

Figure 2:
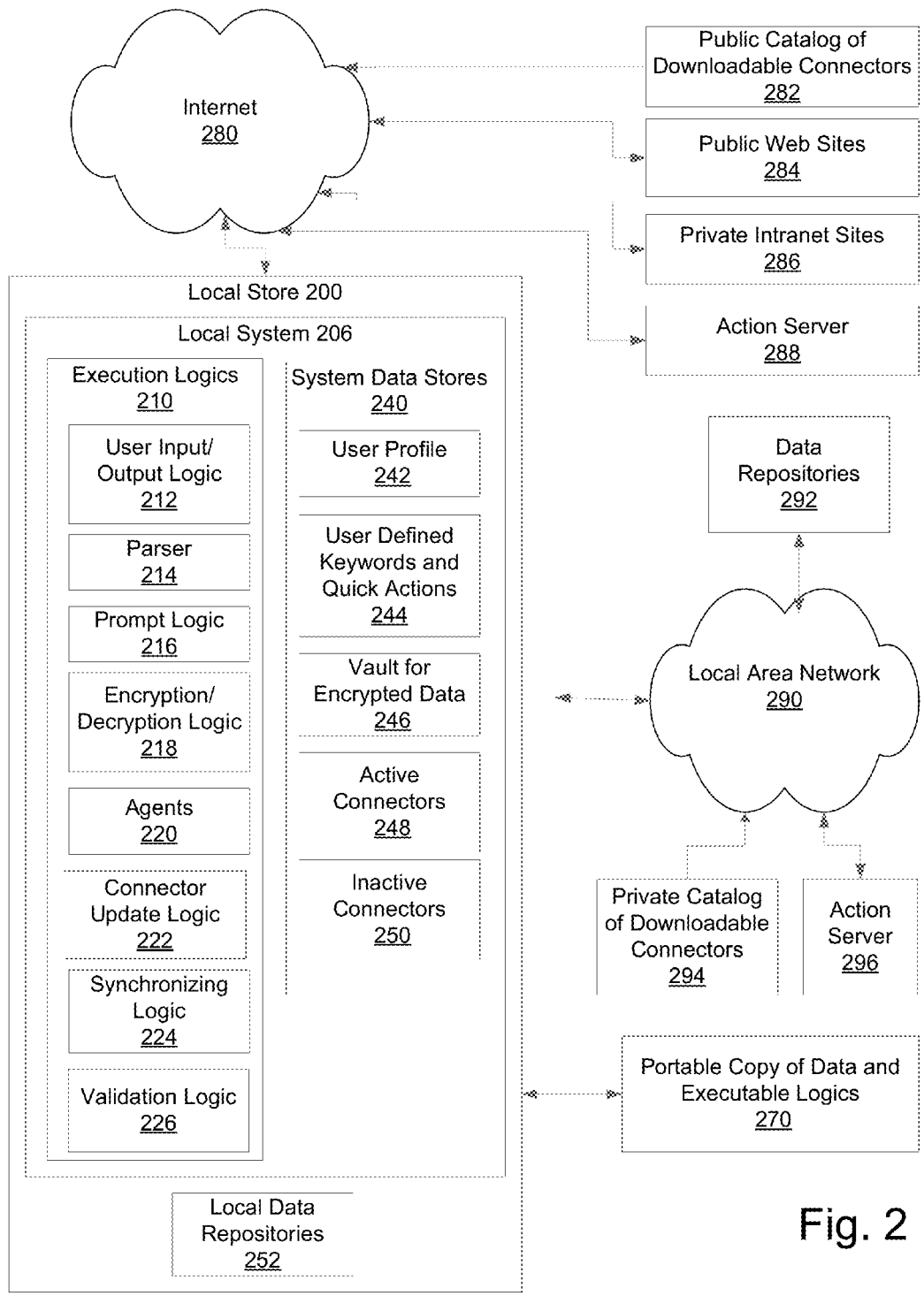
FIG. 2 is a block diagram of one embodiment of the system.

FIG. 2 is a block diagram of one embodiment of the system. In this embodiment, execution logics 210 and local data stores 240 are the parts of the system 206 present in local store 200 on the user's computer. The system employs execution logics 210 and the system data stores 240 to respond to user-entered action messages invoking interaction with various data repositories, such as other local data repositories 252 on the user's computer, for example calendar and to-do list data stores, or repositories located on public web sites 284 or private intranet sites 286, both accessible to the user's computer via the Internet 289, or data repositories 292 accessible via local area network 290.

The embodiment of FIG. 2 also includes a second instance of the execution logics 210 and local data stores 240 stored in portable copy of data and executable logics 270, which in one embodiment is stored on a USB flash drive to be carried from place to place and used with other computers. In one embodiment, synchronizing logic 224, employing techniques known to those skilled in the art, is used to keep local data stores 240 in synchronization with those stored in portable copy of data and executable logics 270. In another embodiment, executable logics 210 are also synchronized. In one embodiment, only a subset of the execution logics 210 and local data stores 240 may be stored on portable copy 270. In one embodiment, the user may specify which logics and stores should be kept synchronized with the local system 206.

In one embodiment, execution logics 210 include all scripts and active executable files such as agents, while system data stores 240 include data utilized by those execution logics 210, including data to invoke those execution logics. Note that the separation of execution logics 210 and data stores 240 in these figures is only for illustrative purposes. In an actual computing environment, both may be stored in various formats, including in a single database shared by execution logics 210 and data stores 240.

The system includes one or more active connectors 248 and one or more agents 220 stored on the user's local store 200. In this embodiment, the vault for encrypted data 248 stores in secure form user names and passwords needed for access to password-protected destinations, and also provides for the secure storage of other confidential information as encrypted notes entered by the user.

Encryption/decryption logic 218 provides for encrypting data on its way into vault 246 and for decrypting on the way out. In one embodiment, such encryption and decryption is always under the control of an authorized user since a master user password is required for access to vault 248.

An agent 220 may, in one embodiment, include an action logic that accesses the vault for encrypted data 246, to obtain the user's credentials used by the agent for logging in to the user's account at a password-protected Web site. The agent may include other action logics, which perform other actions. In one embodiment, multiple agents may be invoked by a connector, each including one or more action logics for executing other kinds of actions.

A connector 248 may contain information used by the agent(s) 220 to complete the particular actions. For example, the connector for requesting a map from MAPQUEST includes: one or more keywords for selecting the connector (it can also be selected manually from a displayed list), prompt information presented to the user by prompt logic 216 once the connector is selected which describes the action to be taken, and shows the user the needed format for data entry, and information such as URLs used to specify actions to be executed by the agent. The Amazon Log-in and Book Search connector, for example, includes two actions, one for log-in and a second for search, which are executed sequentially as follows:

First Action: Execute an automation action to log-in to the account at the site.
1. log-in by sending to the specified URL a query for downloading a log-in page to the client;
2, extract log-in data for this particular connector from the vault for encrypted data 246 into the log-in form on the page, and
3. enter the log-in data to the downloaded form and submit the form to the browser which transmits a query to the Web site for execution by the server logic.

Second Action: Execute an automation action to trigger a search at the site.
1. send a query to a new URL for downloading a search page,
2. enter the search string extracted from the action message into the search form, and
3. submit the form to the browser, which sends a query to the Web site server for execution of the search.

In one embodiment, the system includes connector update logic 222. Connector update logic 222 may be any system that enables the downloading of short scripts or similar data from repositories such as public catalog of downloadable connectors 282 or private catalog of downloadable connectors 294. In one embodiment, after connectors are downloaded, they can be updated from time to time either automatically or by request from the user, using techniques known to those skilled in the art.

Connectors are updated to reflect changes at the destination sites. For example, URLs or field names can change on a web site. The connector for that website would then need to be updated to reflect the new information. In one embodiment, update logic 222 includes facilities for the user to assign connectors to Active or Inactive status by assigning them to the store of active connectors 248 or to the store of inactive connectors 250. In another embodiment, if a connector is not used for a set period of time—such as 6 months—it is moved to the inactive connectors 250, In another embodiment, connector status is determined by setting a flag associated with the connector. In one embodiment, the flags may be included with the connector records in a single store of all downloaded connectors. In another embodiment, an account is maintained for each user in the catalog of downloadable connectors, and users can visit the catalog to edit their connector lists, so only connectors of interest to them are downloaded to them and subsequently updated.

In one embodiment, a connector may include one or more URLs or other destination address specifications for an action, which along with form and input field names or other identifications are entered manually when the connector itself is created. In another embodiment, such data may be captured by automatic means by software for creating new connectors. The use of such script creation tools, which enable reproduction of actions after navigating manually to the destination page, is known in the art.

In one embodiment, there is a local verification logic 226 to verify the data that the user has filled in into the connector each time the connector is selected and submitted for execution. In one embodiment, connector creation software includes verification logic 226 that may run the connector and the agent it invokes, in a mode that provides feedback to the user. Once correct operation of the connector has been verified, it is stored as a local connector in connector store 248 or 250. In one embodiment, verification logic 226 is used to test connectors when they are first created and from time to time thereafter so that connectors in a stored catalog, for example, can be kept in working condition.

In one embodiment, the user's system includes a user input/output logic 212 to initiate actions, and receive return data from actions, if appropriate. In one embodiment, return data from actions may simply be stored on the user's system or elsewhere without displaying it via user input/output logic 212. In one embodiment, the user may further define new connectors and/or agents utilizing user input/output logic 212.

In one embodiment, user input/output logic 212 provides for typed input and visual output. In one embodiment, user input/output logic 212 provides speech input and audible output from the system. In one embodiment, when the system detects a keyword or phrase uttered by the user, it responds with a beep or other audio indication to inform the user that a connector has been selected. In one embodiment, audible prompt information is then presented. In another embodiment employing speech input, audible prompt information is presented only after a pause in the user's utterance after a connector selection has been detected. If there is no pause, no prompt is given. In other embodiments, other combinations of speech or typed input and visual or audible out put are employed, for example, typed input and audible output or speech input and visual display output. For embodiments employing speech input, spoken commands may replace the user activated buttons appearing on the visual display of embodiments that employ a graphical user interface. One embodiment employs only text input and text output means, with no graphical user interface. Such an embodiment is useful for blind or visually impaired users who can process the output text with Braille translators and whose input means cannot include mouse clicking on a visual display.

In one embodiment, data entered via the user interface 212 is evaluated by parser 214, to identify connectors invoked by the user. In one embodiment, the user may enter an action message, and data from the message may be acted upon by the parser 214 to detect that a keyword, which results in the selection of the connector. In one embodiment, the user may also manually select one or more connectors from the active connectors 248. In one embodiment, a drop-down box or other listing may be shown to the user to enable manual selection of a connector.

In one embodiment, user profile 242 stores information entered by the user such as name, address, and other information. In one embodiment, the profile information may be stored in individual fields which can be accessed by an agent when directed to do so by a connector. For example, the connector for retrieving a weather report from Yahoo specifies that the agent extract as a default the ZIP code from the user's profile.

User defined keywords and quick actions 244 are a set of user-created files linked to one or more connectors to enable customization of the system without disturbing shared components like connectors. User created keywords are aliases for the standard keyword(s) included in a connector. Quick actions are employed in one embodiment as shortcuts or macros where the user can store an action message containing any text, for example text including a keyword and search string. The action message can then be stored as a quick action along with a user-defined keyword that can invoke it for execution as a normal action message. This facility is useful for executing recurring identical or almost identical action messages.

In one embodiment, all the files created by the user: the encrypted vault contents with its user credentials and encrypted user notes, the user profile, user-defined keywords, and quick actions, are stored in one personal data folder for easy backup.

Action servers 288, 296 may be destinations for connectors. Action server 288 is accessible via the Internet 280, and action server 296 is accessible via local area network 290. Both can be addressed as destinations for actions specified by active connectors 248. They may contain, for example, SQL databases which can be posted to or queried via action messages.

FIG. 2 shows system execution logics and system data stores for the user all contained in the user's local system 206. In another embodiment, these functions are divided between the user's computer, which may be a handheld device, and one or more remotely located servers accessible via the Internet or local area network.

For example, in one embodiment a handheld device contains user input/output logic 212, a parser 214, simplified connectors 248 containing prompt information, plus an execution agent sufficient to provide user prompt information after connector selection by keyword or manual selection. On dispatch by the user, the execution agent transmits a secure action message to a remote action server. In one embodiment, the secure action message may be transmitted via email, HTTPS post, or other means. The secure action message, in one embodiment, contains only the address of the server, user id, the connector id and the text of the user's action message. The action server contains an account for the user with a vault for the user's log-in credentials, additional connector information sufficient to enable server execution logic to execute the actions specified by the connector in the server. These actions may include, for example, logging the user into a password-protected account elsewhere and then triggering one or more additional actions there such as a search based on the contents of the user's action message.

Figure 3:
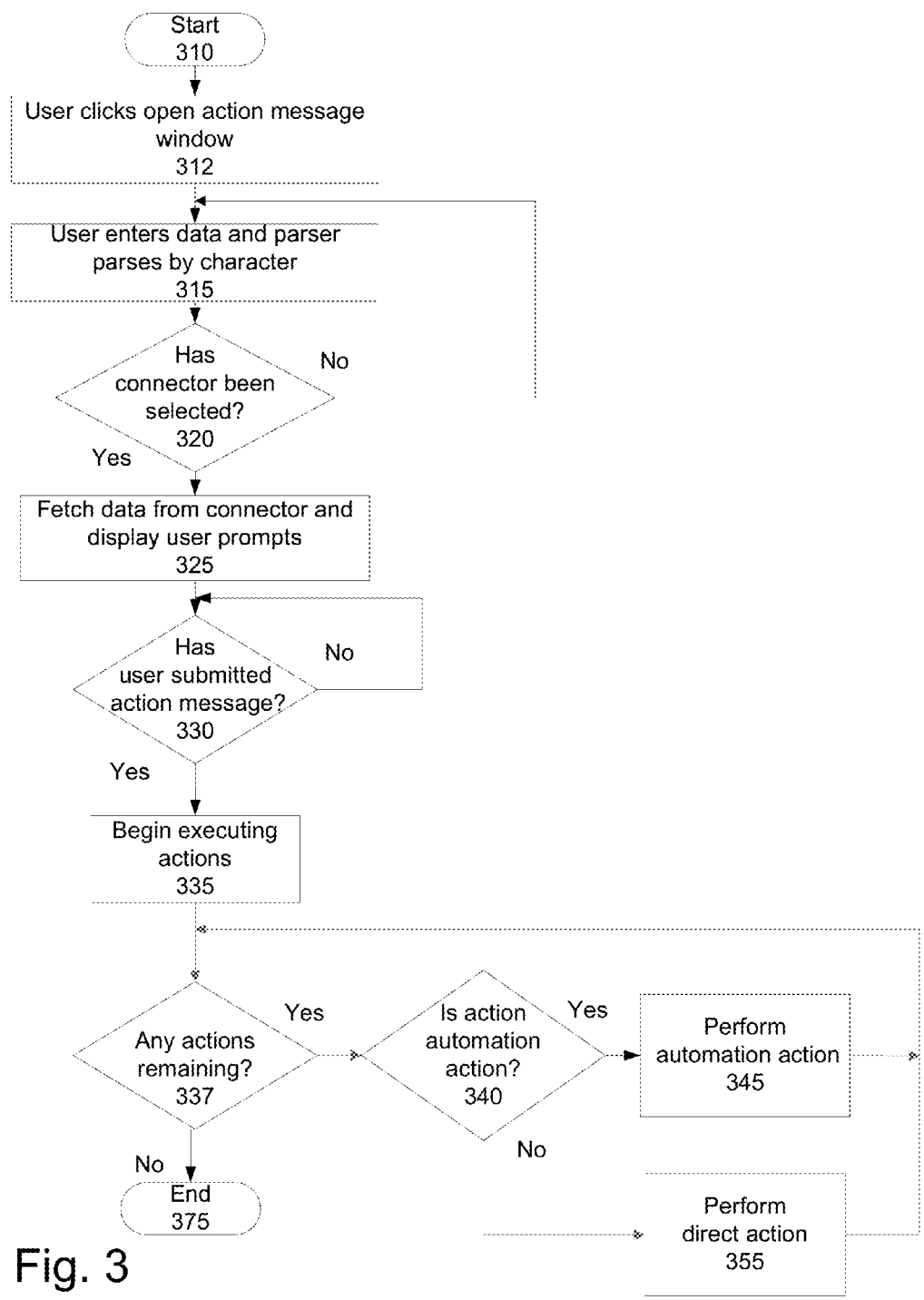
FIG. 3 is a flowchart of one embodiment of using the system.

FIG. 3 is a flowchart of one embodiment of using the system. The process starts at block 310. In one embodiment, this process runs as a background process, whenever the agent application is available to the user.

At block 312, the user clicks open an action message window. In one embodiment, this can include a "text grab" function that opens a new message window, copying and entering into it any highlighted text on the user's screen.

At block 315, the user enters data. In one embodiment, the parser detects entry of a keyword for selecting the intended connector by parsing the entire message as each new character is entered. In another embodiment, the parser may parse upon receiving a space character, an enter key character, or other indicator. In another embodiment, the user may use an alternative means for selecting a connector from a local store of connectors. In one embodiment, the user may do this by utilizing a drop-down menu, audio output and microphone input, or other mechanisms.

At block 320, the process determines whether a connector has been selected. In one embodiment, the system signifies detection of a keyword to the user by bolding or otherwise highlighting the keyword when it is detected. In another embodiment, an audible beep is sounded to signify keyword detection.

The connector, as noted above, can be invoked by a keyword. If the data entered by the user invokes a connector, or the user selected a connector manually, the process continues to block 325. Otherwise, the process returns to block 315, to continue parsing the user's entry. In one embodiment, the user may be provided with a pull-down menu of connectors. In one embodiment, if the user indicates that his or her entry is complete, and yet no connector has been selected, the system may provide a prompt, a listing of available connectors, or select a default connector. In one embodiment, the user can specify the default connector to be invoked when the action message is dispatched with no connector selected. In one embodiment, a list of the available connectors may be displayed in a "best match" order based on the contents of the action message.

Once a connector has been selected, the process continues to block 325.

At block 325, data is fetched from the connector. The data may include one or more of the following: prompts for display to the user, one or more actions to be executed by one or more agents, etc. In one embodiment, an action may include the specification of locations to insert variables entered by the user or fetched from other specified locations. For example, the selected connector may specify actions that invoke an agent to "log-in and search for a topic at Britannica.com™." The keyword for this connector may be "ency" or "britannica." The variable to be entered by the user may be the search topic (e.g. "Charles Dickens"). The actions may be (1) log-in to the web site using account credentials for this connector stored in the vault, (2) trigger a search at the site using as the search term the variable entered by user (i.e., the action message less the keyword). The actions may end with the search for the topic, depending upon the destination server to return an appropriate display page to the user. In another embodiment, the agent extracts the search results and presents them to the user, or makes some other use of them.

At block 330, in one embodiment, the process determines whether the user has activated the action message/agent. In one embodiment, the user presses "Enter", clicks on an "activate" button, or otherwise indicates that he or she wishes to dispatch the agent. Until that occurs, in one embodiment the process waits for activation.

At block 335, the system begins sequentially executing the actions called for in the selected connector. At block 337, the process determines whether there are any remaining actions to execute. If there are no further actions, the process of executing this particular action message terminates at block 375. If there are further actions to be executed, the process continues to block 340.

At block 340, the process determines that the first action called for by the connector selected for the Britannica example is an automation action.

If at block 340, the first action called for by the selected connector was identified as an automation action, the process continues to block 345. At block 345, the execution logic, acting on information specifying inputs needed for the action supplied by the connector, retrieves the inputs, in the Britannica case the appropriate encrypted log-in credential(s) from the vault. In one embodiment, there are two credentials: user name and password. In one embodiment, the credentials are retrieved directly from the secure repository in the user's computer system. In another embodiment, the credential may be retrieved from a different secure storage area. The credentials are decrypted, entered into the appropriate location(s) in the log-in form, and submitted to the web site, which logs in the user. The process then continues to block 337, to determine whether there are any further actions to be taken. FIG. 4 below provides further details on one embodiment of the implementation of the automation action.

If the action was found not to be an automation action, at block 340, the process continues to block 355, and performs a direct action. FIG. 5 below illustrates one embodiment of performing such a direct action.

In one embodiment, additional action types may be invoked, adding pairs of decision and action blocks, similar to blocks 340, 345, and 355. Two such additional action types are described below. In addition, agents executing other action types can be added, to execute actions such as posting to a user's calendar by detecting as keywords expressions for date and time.

In this way, the system permits the user to easily access data, even data that would normally require a prior log-in process from the user. An action message invoking a log-in action is indistinguishable from one that does not, so logging in to password-protected Web sites requires no special input from the user (once the user has logged in to the system). Using the system to gain access to data at a non-password protected site is easier than accessing that data by conventional browsing. Adding password protection to a site normally decreases ease of access, but not for users of this system, which reverses the general rule that increased security comes always at the cost of decreased ease of access. Using this system to log-in and execute a search at a password protected Web site is easier than executing a search at a non-password protected site by conventional browsing, even when using a bookmark.

The process is secure, because the destination address where the credential is inserted is linked to a previously installed authorized connector that specifies the URL where the credentials are to be entered. Therefore, the identity theft and phishing attacks that result from typos, redirections, and other similar navigation errors cannot work on this system. Also, since confidential data is not entered by keyboard, both software keyboard loggers and visual snoopers are thwarted.

In one embodiment, each type of log-in data need only be entered once. So, for example, the user may have multiple connectors which utilize credit card data. The user only needs to enter the credential data into the secure repository or vault once. When initializing subsequent connectors, the user may make reference to the secure credential. In one embodiment, in order to do so, the user must first log-in into the secure repository.

In one embodiment, each connector, when it is initially acquired, has one or more associated keywords. However, the user may customize the connector by defining any keyword(s) he or she prefers. For example, the keyword for "look up this term in a dictionary" may be "dict," but the user may prefer to use "define," or a similar term. The user may associate as many keywords with a connector as he or she wishes. In one embodiment, the system ensures that each keyword only refers to a single connector. Thus, if the user wishes to define a keyword to invoke a connector, it is tested against the existing set of keywords, to ensure uniqueness. This is to make sure that the user does not accidentally invoke the wrong connector, because of keyword confusion.

In one embodiment, user-created keywords are linked to the connector they invoke, but are stored separately from the connectors so connector files can be maintained without complications arising from user modifications.

In another embodiment, a single keyword can invoke multiple connectors, each performing one or more actions specified by the connector. For example, the keyword "search" could invoke searches by several Web search engines, with each result displayed in a separate window. In another embodiment, multiple results are "scraped" and data from them combined into a single window for presentation to the user.

FIG. 4 is a flowchart of one embodiment for performing an automation action. FIG. 4 is an expansion of block 345 of FIG. 3. The process starts at block 410 when the agent is called upon to execute an action and it determines that the action is an automation action. It proceeds to block 420, where it fetches from the selected connector the URL specifying the location of the form page it is in effect to fill out and submit. It proceeds to block 430, where it submits a request to that URL for the needed page.

At block 440, it extracts from the connector the form name or other identification for the form to be filled in, as well as the name and other information required for each needed input. The connector may also identify the data type for each input, which tells the agent where to find the corresponding variables. For example, a password type signifies data to be found in the vault, as a password type linked to the present connector; the location of a string to be entered as an input for a form can be signified by a value type specifying the user's text message or a value type identifying a specific field in the profile. In one embodiment, secured credentials are retrieved from a vault. In one embodiment, there are two credentials: user name and password.

In one embodiment, the credentials are retrieved directly from the secure repository in the user's computer system. In another embodiment, the credential may be retrieved from a different secure storage area. The credentials are decrypted. In one embodiment, a public-private key structure may be used for encrypting the credentials. In another embodiment, a symmetric key may be used. In another embodiment, any other encryption technique now known or later developed may be used to protect the credential when it is not actively being used by the agent.

The agent proceeds to block 450, where it fetches a value, found as described above, and posts the name/value pair to the browser object for the form it will submit for execution: in effect, it fills in the form. When all the inputs are filled in, decision block 460 indicates no more inputs, and control passes to block 465, where the agent submits the form, just as if it had been manually filled in and submitted by the user.

At block 470, the browser responds to submission of the form, executing any scripts or applets included in the downloaded page that are invoked by submission of the form. The browser completes this step by submitting the resultant query to the Web server. At block 480, the web server executes its response to the query, which can be a log-in to the user's account, or posting to a data repository, or triggering an action such as a search based on information contained in the submitted query. The process ends at block 490.

FIG. 5 is a flowchart of one embodiment for performing a direct action. This is an exemplary embodiment of the action shown as block 355 of FIG. 3. A direct action sends a filled in form directly to a destination Web site, without first downloading the form from the site. In so doing, it saves one round trip to the web: it eliminates sending the request for the form, and the download of the form in response. This 50% reduction in web traffic can be significant where network connection is slow, perhaps doubling the speed of 'a web interaction, in addition to time savings from simpler user behavior needed to effect the desired operation. This may also be useful in situations where the user is paying for bandwidth by the bit.

The direct action process starts at block 510 when the agent is requested to perform a direct action. In block 520, the agent fetches the destination URL for the filled in form and its input names and value types directly from the connector, not from a form page it has requested and downloaded. In block 530, it extracts an input value from a source indicated by the connector, and posts the name/value pair to the browser object for the query it is assembling. When there are no more inputs, as determined at block 540, the process assembles the completed query, addressing it to the URL specified in the direct action.

At block 570, it dispatches the query, which is acted upon by the web server, at block 580. The process ends at block 590. Direct actions work for forms that do not depend on execution of scripts or applets elsewhere on the form page. Many forms, especially login forms, do depend on such other executable objects on the form age. Direct actions generally cannot be used for such forms.

Figure 6:
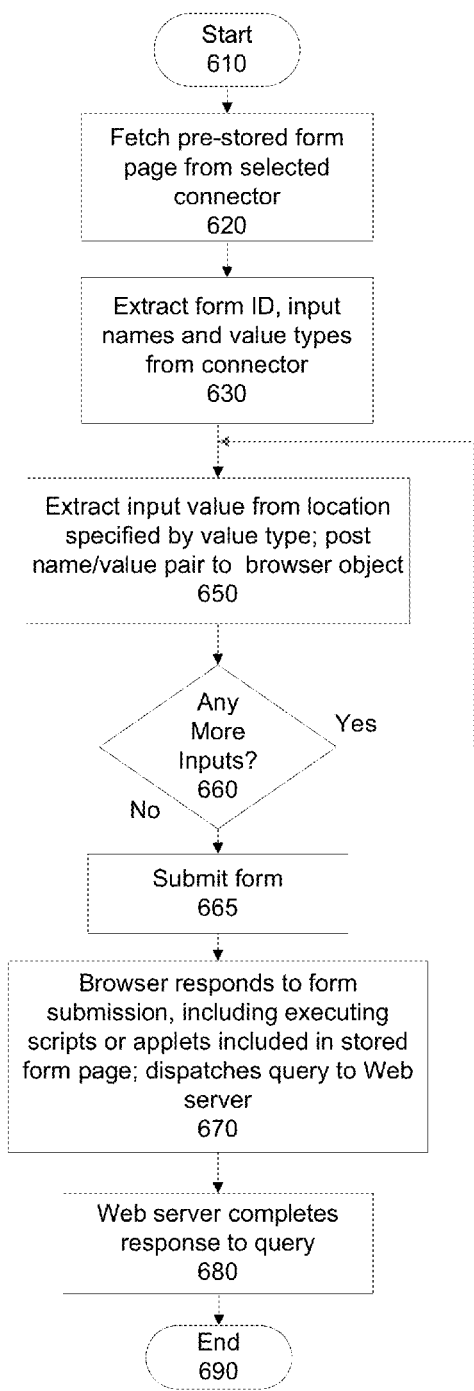
FIG. 6 is a flowchart illustrating one embodiment of execution of an extended direct action.

FIG. 6 is a flowchart of one embodiment for performing yet another kind of action, which we call here an expanded direct action. Like the direct action, it involves submission of a filled in form to the web server, eliminating the need for first downloading the form. Like the automation action, it can submit a form whose execution depends on scripts and applets on the form page. It accomplishes this by pre-downloading the entire form page, in effect making it a part of the connector. In one embodiment, the downloaded form page is stored as part of the connector. In another embodiment, it is stored locally at some address linked to by the connector. Both embodiments are functionally equivalent. It is not necessary to store every element included on the downloaded form page. Only those elements used in responding to submission of the form are stored, in one embodiment.

The process starts at block 610, when the agent is requested to perform an extended direct action. At block 620, the pre-stored data (the form page or all of its essential elements) is fetched from the location specified by the connector. At block 630, the agent proceeds to extract from the connector the data needed to submit the form: form name or ID, input names and value types. At block 650, inputs are posted to the browser object and the process repeated until there are no more inputs, block 660. At that point, the agent submits the form, block 665. The browser responds to the submission, including execution of any scripts or applets referenced in the stored form, and dispatches a query to the web server, the first trip out to the web in executing this action. The web server responds in block 680, and the process ends at block 690.

Extended direct actions reduce the amount of data sent over the network, but require more local data storage. The increasing local storage capacity of personal computers makes feasible the storage of web form pages for extended direct actions.

Figure 7:
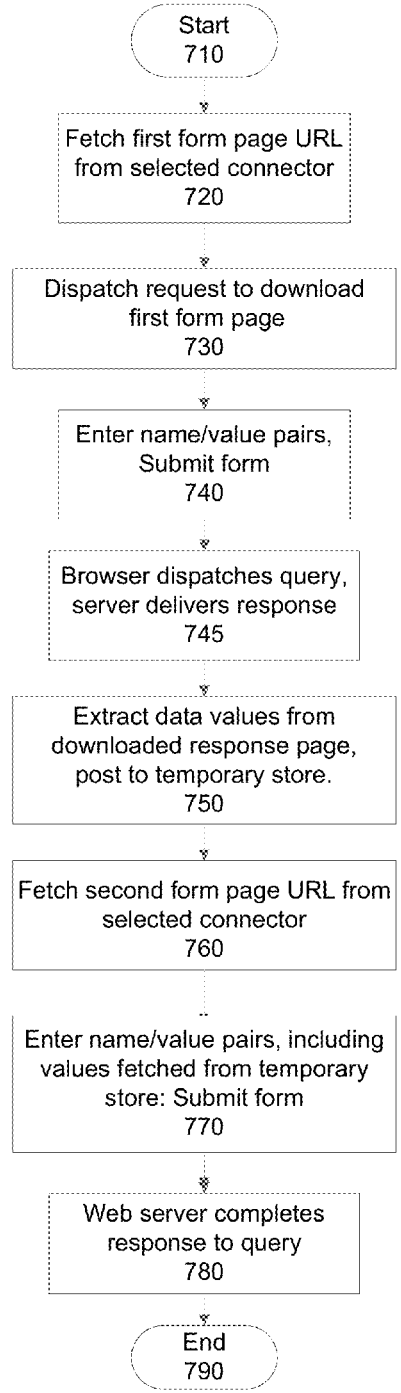
FIG. 7 is a flowchart illustrating one embodiment of execution of a compound action.

FIG. 7 is a flowchart of one embodiment for performing yet another kind of action, referred to as a compound action. In this type of action, the agent performs two or more actions sequentially. In one embodiment, the agent may obtain data from the first action, store it in a temporary location, then use that data for submission in a subsequent action. A compound action of this type could be included in a connector whose first action specifies log-in to a site, then specifies a compound action as shown in FIG. 7. For example, execution of an action message invoking a connector including a compound action could accomplish 1. logging in to the first site; 2. performing a search at that site and extracting data resulting from the search; and 3. posting the data to a second site. Steps 2 and 3 are accomplished by a single compound action.

The process starts at block 710. The initial steps, fetching the URL for the form page, dispatching a query to download the form page, entering the name/value pairs, submitting the form, and having the browser dispatch the query and deliver a response (blocks 720-745) are substantially identical to the automation action described above with respect to FIG. 4.

At block 750, the agent extracts data from the results page, using data scraping techniques known to those skilled in the art, and posts that data to a temporary store. The temporary store, in one embodiment, is on the user's local system. In another embodiment, it is on a remote server. At block 760, the agent downloads a second form page from a second URL specified in this compound action, and then at block 770 enters into the browser object for the form data values fetched from the temporary store and submits the form.

In a subsequent action, the extracted data in the temporary store may be utilized as a variable submitted to another site. The extracted data, in one embodiment, may simply be posted to a specified place on the site. In another embodiment, the extracted data may be combined with later extracted data, to present composite data to the user. The process ends at block 790.

FIG. 8 illustrates one embodiment of a connector script for the Encyclopedia Britannica Web site that includes an automation action for log-in and another automation action for conducting a search at the site once logged in. The XML-like script begins with a NAME for the connector and a Description whose elements are used both for cataloging the connector and for prompting the user. Two Keywords are defined as tags <kw>ency</kw> and <kw>britannica</kw>. Two automation actions are included, each between <ACM> and </ACM> tags. The first is ACTION="Login", invoking use of an AGENT="SimpleWebAgent". The automation tag is set to True, which specifies that this is an automation action. The Form tag includes Action="https://securebritannica.com/login", a URL specifying the location of the log-in form to be requested, filled in and submitted. Two hidden inputs in the form are included for completeness of the query to be submitted, Input TKTYPE="tkUserName" signifies that this variable is the user name in the vault, linked for this connector. The name "username" is used for the name/value pair to be assembled by the agent for the form. Similarly, TKTYPE="tkPassword" signifies that the needed variable is the password for this connector to be found in the vault, and its name for the form is "password."

The second action is ACTION="Save", signifying, in effect, filling in and submitting a non-log-in form. Location of the form to be filled out is given by the Form Action. The search variable for the form has NAME="query". TKTYPE="tkQueryString" tells the agent to strip the keyword, if present, from the user text message, and post the remainder as the query value in the form.

FIG. 9 illustrates one embodiment of a connector script for the MapQuest.com Web site that includes a direct action and entry of multi-field data by the user.

Keywords specified in the connector are <mq> and <map>. The ACTION="Save" says that this is submission of a non-login form, to be done by AGENT="SimpleWebAgent". The absence of an <automation>True</automation> tag means that this will fall through to the default action type, which is a direct action. The URL contained in the Form Action is not one from which a form download is to be requested, but the address to which the filled in form is to be sent. The connector specifies the three fields to be filled in by the user, named "address", "city" and "state". That they are to be three comma-separated fields is conveyed by the input attributes TKYPE="tkCommaWord1", etc.

Figure 10:
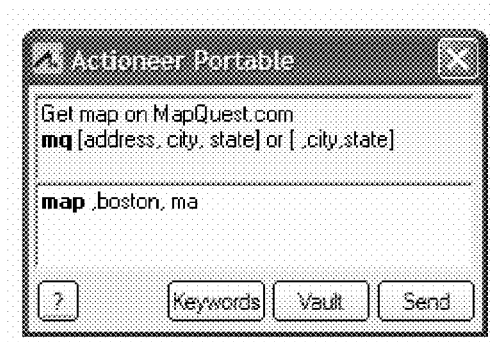
FIG. 10 is a screen shot illustrating one embodiment of an action message window.

FIG. 10 is a screen shot illustrating one embodiment of a window open for entering an action message. This and subsequent screen shots were produced by a portable embodiment of the system residing in a USB flash drive. A keyword 'map' has been entered by the user and the system has highlighted it to show that a connector has been selected. The prompt area at the top provides a description of the action to be taken: "get map on MapQuest.com" and shows two examples of properly formatted input: "mq [address, city, state] or [,city, state]" to make clear the needed input format, and that two commas must be included for correct submission. The connector selection was triggered by the keyword map, and the prompt window here shows another keyword, mq that will also select this connector. The various data entered by the system for prompting the user were all extracted from the MapQuest connector; they can be found in the description and keyword parts of the connector shown in FIG. 9.

Figure 11:
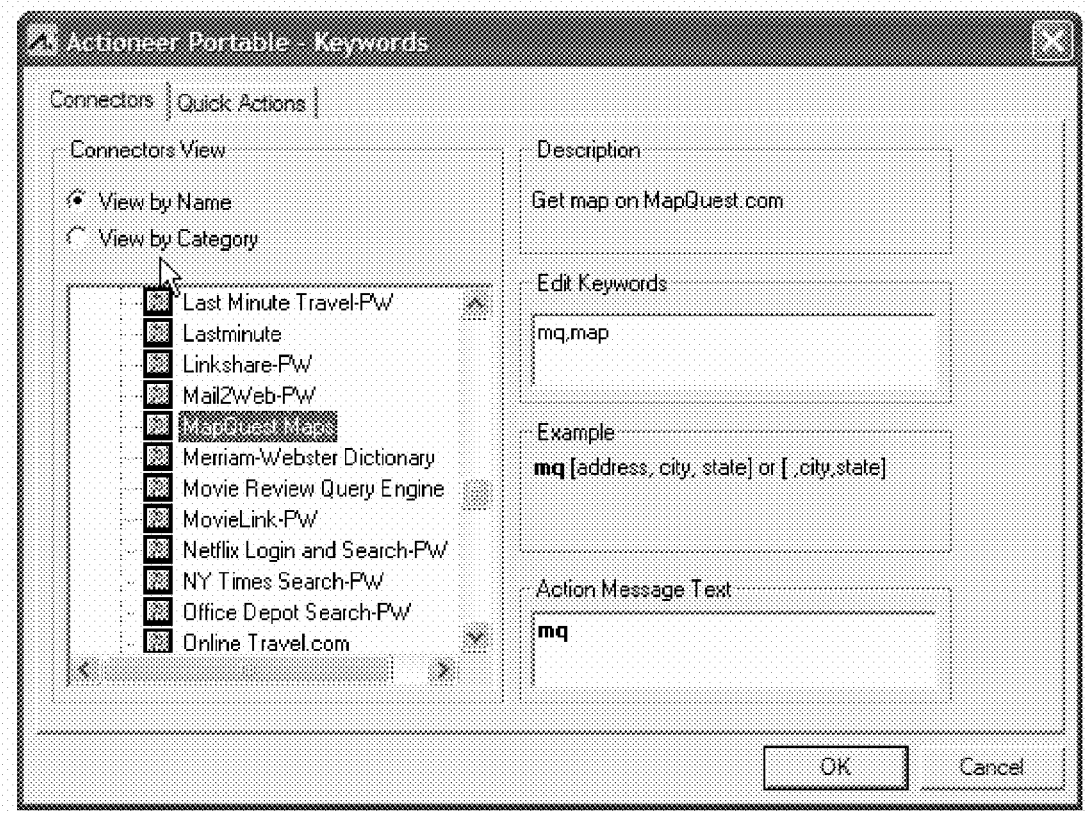
FIG. 11 is a screen shot illustrating one embodiment of a drop down list of connectors presented for manual selection.

FIG. 11 is a screen shot illustrating one embodiment of a window showing a list of connectors open for manual selection. The user has clicked on MapQuest Maps, which the system has highlighted. Various data fields are populated with information extracted from the MapQuest connector: the description, the keywords, and the example, and it has entered the first of the standard keywords, mq, into the otherwise still empty action message. At this point, in this embodiment, the user is free to enter a new custom keyword in Edit Keyword, to add text to the action message to select another connector, or to click open Quick Actions to view or edit. On clicking OK with the screen as shown, the system will revert to an Action Message window with the keyword mq entered by the system plus any additional text entered by the user.

Figure 12:
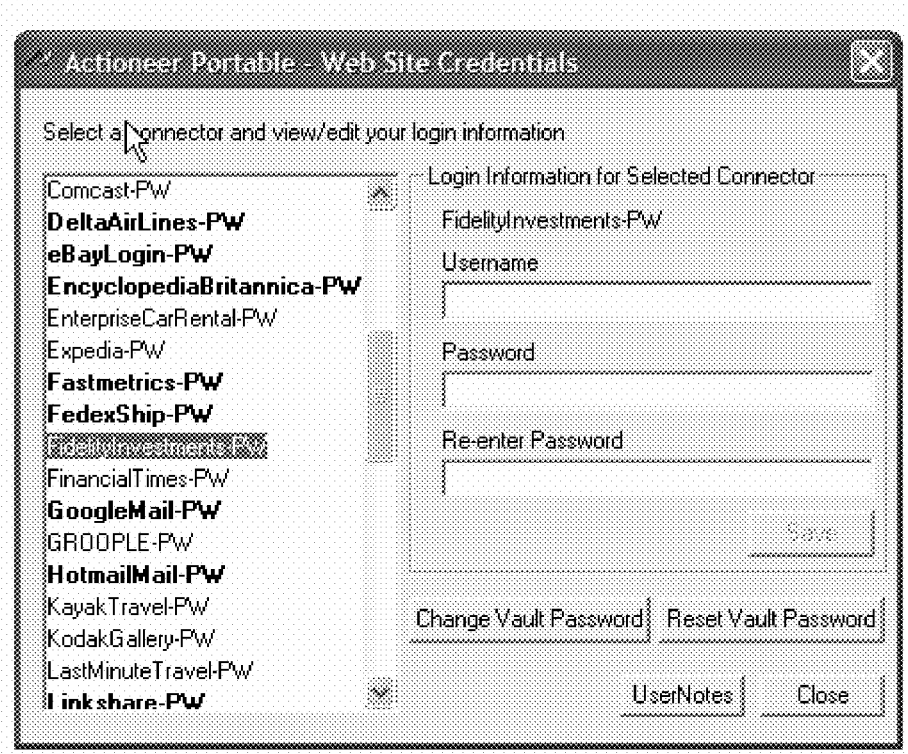
FIG. 12 is a screen shot illustrating one embodiment of the presentation of connectors linked to the vault, for user entry of confidential credentials.

FIG. 12 is a screen shot illustrating one embodiment of a window showing a list of password connectors for entering secure credentials. The user has entered the master password needed for access to the vault, and selected for entry of credentials the Prudential Investments site. The list of PW connectors shows in bold type those connectors for which credentials have been entered which enables the system to perform automatic login for them. Plain (unbolded) type listings do not yet have log-in credentials entered, so automatic log-in is not yet possible for them.

Figure 13:
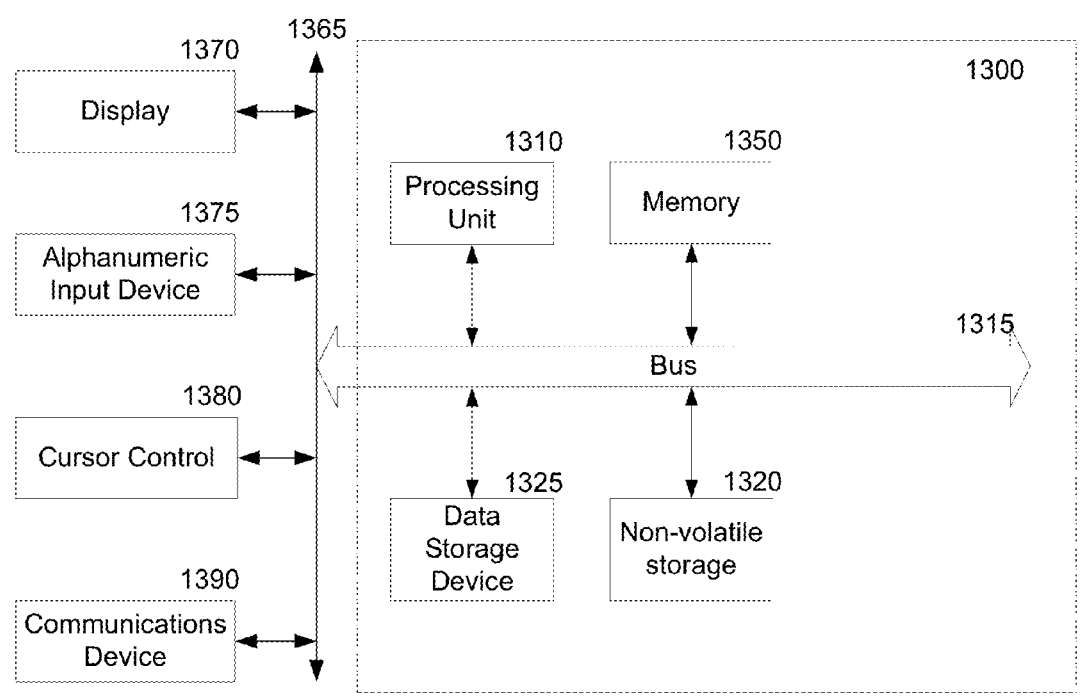
FIG. 13 is a block diagram of one embodiment of a computer system, which may be used with the present invention.

FIG. 13 is one embodiment of a computer system that may be used with the present invention. It will be apparent to those of ordinary skill in the art, however that other alternative systems of various system architectures may also be used.

The data processing system illustrated in FIG. 13 includes a bus or other internal communication means 1315 for communicating information, and a processor 1310 coupled to the bus 1315 for processing information. The system further comprises a random access memory (RAM) or other volatile storage device 1350 (referred to as memory), coupled to bus 1315 for storing information and instructions to be executed by processor 1310. Main memory 1350 also may be used for storing temporary variables or other intermediate information during execution of instructions by processor 1310. The system also comprises a read only memory (ROM) and/or static storage device 1320 coupled to bus 615 for storing static information and instructions for processor 1310, and a data storage device 1325 such as a magnetic disk or optical disk and its corresponding disk drive. Data storage device 1325 is coupled to bus 1315 for storing information and instructions.

The system may further be coupled to a display device 1370, such as a cathode ray tube (CRT) or a liquid crystal display (LCD) coupled to bus 1315 through bus 1365 for displaying information to a computer user. An alphanumeric input device 1375, including alphanumeric and other keys, may also be coupled to bus 1315 through bus 1365 for communicating information and command selections to processor 1310. An additional user input device is cursor control device 1380, such as a mouse, a trackball, stylus, or cursor direction keys coupled to bus 1315 through bus 1365 for communicating direction information and command selections to processor 1310, and for controlling cursor movement on display device 1370. The system may also include a microphone for speech input and a loudspeaker or headphones for audio output.

Another device, which may optionally be coupled to computer system 1300, is a communication device 1390 for accessing other nodes of a distributed system via a network. The communication device 1390 may include any of a number of commercially available networking peripheral devices such as those used for coupling to an Ethernet, token ring, Internet, or wide area network. The communication device 1390 may further be a null-modem connection, a wireless connection mechanism, or any other mechanism that provides connectivity between the computer system 1300 and the outside world. Note that any or all of the components of this system illustrated in FIG. 13 and associated hardware may be used in various embodiments of the present invention.

It will be appreciated by those of ordinary skill in the art that any configuration of the system may be used for various purposes according to the particular implementation. The control logic or software implementing the present invention can be stored in main memory 1350, mass storage device 1325, or other storage medium locally or remotely accessible to processor 1310. In one embodiment, information permanently stored on a data storage device 1325 is loaded into memory 1350 each time the system is started up, to provide quicker response to user actions.

It will be apparent to those of ordinary skill in the art that the system, method, and process described herein can be implemented as software stored in main memory 1350 or read only memory 1320 and executed by processor 1310. This control logic or software may also be resident on an article of manufacture comprising a computer readable medium having computer readable program code embodied therein and being readable by the mass storage device 1325 and for causing the processor 1310 to operate in accordance with the methods and teachings herein.

The present invention may also be embodied in a handheld or portable device containing a subset of the computer hardware components described above. For example, the handheld device may be configured to contain only the bus 1315, the processor 1310, and memory 1350 and/or 1325. The present invention may also be embodied in a special purpose appliance including a subset of the computer hardware components described above. For example, the appliance may include a processor 1310, a data storage device 1325, a bus 1315, and memory 1350, and only rudimentary communications mechanisms, such as a small touch-screen that permits the user to communicate in a basic manner with the device. In general, the more special-purpose the device is, the fewer of the elements need be present for the device to function. In some devices, communications with the user may be through a touch-based screen, or similar mechanism.

It will be appreciated by those of ordinary skill in the art that any configuration of the system may be used for various purposes according to the particular implementation. The control logic or software implementing the present invention can be stored on any machine-readable medium locally or remotely accessible to processor 1310. A machine-readable medium includes any mechanism for storing or transmitting information in a form readable by a machine (e.g. a computer). For example, a machine readable medium includes read-only memory (ROM), random access memory (RAM), magnetic disk storage media, optical storage media, flash memory devices, electrical, optical, acoustical or other forms of propagated signals (e.g. carrier waves, infrared signals, digital signals, etc.).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A system to enable a user device to engage in an interaction with a plurality of third party computer resources, the system comprising:
    a repository stored in non-volatile memory on the user device including user-specific data securely stored and associated with a particular resource of the plurality of third party computing resources, the user-specific data used to access a feature in a particular resource of the plurality of third party computing resources;
    a user interface to enable a user to select an action associated with one of the plurality of third party computer resources;
    execution logic to create and send one or more action messages to the particular resource, to effect the selected action by executing an action step at the particular computing resource, where executing the action steps comprises:
       dispatching a query to the particular computing resource using a path specified in the action step;
       identifying a location at the particular resource where the user-specific data is to be placed;
       posting the user-specific data in the identified location.

2. The system of claim 1, wherein the user device further comprises:
    a public catalog including a plurality of connectors, each connector comprising the action step and the path to the particular computer resource.

3. The system of claim 2, further comprising:
    connector update logic in the user device to access and to update connector storage in the user device with data from a user account consisting of connectors selected from the public catalog.

4. The system of claim 3, wherein the connector execution logic downloads a default set of connectors to the user device.

5. The system of claim 4, wherein at least some of the connectors in the default set of connectors cannot be deleted by the user.

6. The system of claim 1, wherein the user specific data comprises one or more of: a user name and a password.

7. The system of claim 1, further comprising:
    the execution logic to insert additional data at the particular resource prior to submitting the action.

8. The system of claim 1, wherein a response received from the particular resource in response to submitting the action is used in a next action.

9. The system of claim 8, wherein the next action is one of: executed on the user device, executed on the particular system, and executed on a different third party system.

10. The system of claim 1, further comprising:
    a connector update logic to download a default set of connectors to the user device from a server, when the application is initialized.

11. The system of claim 10, wherein the default set of connectors include one or more default actions, which cannot be deleted by the user.

12. A method to enable a user device to engage in an interaction with a plurality of computer resources, the method comprising:
    receiving a selection from a user, selecting an action to be taken at a particular one of a plurality of computer resources;
    retrieving user-specific data associated with the particular computer resource from a secure repository on the user device, the user-specific data used to access a feature in the particular resource;
    creating and sending an action messages to the particular resource, to effect the selected action by executing an action step at the particular computing resource, where executing the action steps comprises:
       dispatching a query to the particular computing resource using a path specified in the execution logic and in the action step;
       identifying a location at the particular resource where the user-specific data is to be placed;
       posting the user-specific data in the location.

13. The method of claim 12, further comprising:
    updating a connector storage in the user device with data from a user account consisting of connectors selected from a public catalog.

14. The method of claim 13, further comprising:
    downloading a default set of connectors to the user device.

15. The method of claim 14, wherein at least some of the connectors in the default set of connectors cannot be deleted by the user.

16. The method of claim 12, further comprising:
    inserting additional data at the particular resource prior to submitting the action.

17. The method of claim 12, wherein a response received from the particular resource in response to submitting the action is used in a next action.

18. The method of claim 17, wherein the next action is one of: executed on the user device, executed on the particular system, and executed on a different system.

19. The method of claim 12, wherein a connector comprises a base structure which is uniform across all connectors, the base structure including a spot for the path to the computer resource and a spot for the user data.

20. A system to enable a user device to engage in an interaction with a plurality of computer resources, the system comprising:

a user interface to enable the user to select an action associated with a particular one of the plurality of computer resources;

execution logic to create and send an action message to the particular resource, to effect the selected action by executing an action step at the particular computing resource;

the execution logic to create the action message by retrieving user-specific data associated with the particular resource from a secure repository, to identify a location of the particular resource using a path specified in the action step, and to identify additional data is used in the action message when used;

the execution logic further to execute the action message by dispatching a query to the particular computing resource using a path specified in the action step, identifying a location at the particular resource where the user-specific data is to be placed, and posting the user-specific data in the location.

* * * * *